United States Patent
Costabello et al.

(10) Patent No.: US 10,949,718 B2
(45) Date of Patent: Mar. 16, 2021

(54) MULTI-MODAL VISUAL QUESTION ANSWERING SYSTEM

(71) Applicant: Accenture Global Solutions Limited, Dublin (IE)

(72) Inventors: Luca Costabello, Newbridge (IE); Nicholas McCarthy, Dublin (IE); Rory McGrath, Kildare Town (IE); Sumit Pai, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 127 days.

(21) Appl. No.: 16/406,380

(22) Filed: May 8, 2019

(65) Prior Publication Data
US 2020/0356829 A1  Nov. 12, 2020

(51) Int. Cl.
*G06K 9/72* (2006.01)
*G06F 3/0484* (2013.01)
(Continued)

(52) U.S. Cl.
CPC .......... *G06K 9/726* (2013.01); *G06F 3/0484* (2013.01); *G06F 40/30* (2020.01); *G06K 9/6267* (2013.01)

(58) Field of Classification Search
CPC ...... G05B 19/25323; G05B 2219/2613; G05B 2219/2615; G05B 19/041; G05B 19/0426; G05B 2219/40195; G05B 13/0265; G05B 19/042; G05B 2219/25323; G05B 2219/23026; G06N 20/00; G06N 5/025; G06N 3/04; G06N 3/0454; G06N 3/08; G06N 3/10; G06N 3/006; G06N 3/0427; G06N 3/0481; G06N 20/10; G06N 3/004; G06N 5/04; G06N 5/045; G06N 5/022; G06N 5/043; G06N 3/088; G06N 3/02; G06N 5/02; G06N 3/082; G06N 3/126; G06N 5/047; G06F 3/048; G06F 40/30;
(Continued)

(56) References Cited

U.S. PATENT DOCUMENTS 9,965,705 B2   5/2018 Chen et al.
10,157,226 B1  12/2018 Costabello et al.
(Continued)

FOREIGN PATENT DOCUMENTS

WO    WO 2019/148315 A1    8/2019
WO    WO 2019/211250 A1    11/2019

*Primary Examiner* — Nimesh Patel
(74) *Attorney, Agent, or Firm* — Brinks Gilson & Lione

(57) ABSTRACT

The systems and methods described herein may generate multi-modal embeddings with sub-symbolic features and symbolic features. The sub-symbolic embeddings may be generated with computer vision processing. The symbolic features may include mathematical representations of image content, which are enriched with information from background knowledge sources. The system may aggregate the sub-symbolic and symbolic features using aggregation techniques such as concatenation, averaging, summing, and/or maxing. The multi-modal embeddings may be included in a multi-modal embedding model and trained via supervised learning. Once the multi-modal embeddings are trained, the system may generate inferences based on linear algebra operations involving the multi-modal embeddings that are relevant to an inference response to the natural language question and input image.

20 Claims, 7 Drawing Sheets

(51) Int. Cl.
*G06K 9/62* (2006.01)
*G06F 40/30* (2020.01)

(58) Field of Classification Search
CPC .............. G06F 16/217; G06F 16/2428; G06F 16/2465; G06F 16/248; G06F 16/285; G06F 16/3326; G06F 16/3328; G06F 16/355; G06F 16/9535; G06F 40/211; G06F 16/90332; G06F 16/9038; G06F 16/907; G06F 16/957; G06F 1/163; G06F 3/00; G06F 40/40; G06F 8/30; G06F 2221/034; G06F 21/00; G06F 21/55; G06F 16/24578; G06F 16/35; G06F 16/951; G06F 16/3329; G06F 16/538; G06F 16/54; G06F 16/56; G06F 16/9538; G06F 17/16; G06F 17/18; G06F 3/0484; G06F 16/9577; G06F 16/68; G06F 16/338; G06F 16/3322; G06F 16/245; G06F 16/3323; G06F 16/3344; G06F 16/9532; G06F 3/04842; G06F 16/90335; G06F 3/0481; G06F 16/43; G06F 16/532; G06F 16/9024; G06F 1/1686; G06F 16/2228; G06F 16/2264; G06F 16/24; G06F 16/24535; G06F 16/2455; G06F 16/283; G06F 16/3332; G06F 16/334; G06F 16/3349; G06F 16/903; G06F 16/9032; G06F 16/953; G06F 17/11; G06F 17/15; G06F 3/167; G06F 40/216; G06F 40/289; G06F 40/279; G06F 3/04886; G06F 16/345; G06F 3/017; G06F 3/14; G06F 40/16; G06F 40/56; G06F 16/00; G06F 16/434; G06F 16/738; G06F 16/4847; G06F 16/786; G06F 40/20; G06F 16/22; G06F 16/23; G06F 16/316; G06F 16/33; G06F 16/41; G06F 16/436; G06F 16/438; G06F 16/48; G06F 16/58; G06F 16/5854; G06F 16/587; G06F 16/61; G06F 16/65; G06F 16/683; G06F 16/73; G06F 16/7335; G06K 9/6267; G06K 9/66; G06K 9/00288; G06K 9/6256; G06K 9/00281; G06K 9/00765; G06K 9/46; G06K 9/6255; G06K 9/6265; G06K 9/627; G06K 9/6273; G06K 9/6281; G06K 9/6269; G06K 9/20; G06K 9/629; G06K 2209/05; G06K 9/726; G06K 9/6215; G06K 9/6268; G06K 9/228; G06K 9/00664; G06K 9/0063; G06K 9/32; G06K 9/6201; G06K 9/72; G06K 9/00624; G06K 2209/27; G06K 9/00671; G06K 9/00335; G06K 9/4604; G06K 9/6274; G06K 9/00228; G06K 9/36; G06K 9/00771; G06K 9/42; G06K 9/4671; G06K 9/6202; G06K 9/6277; G06K 9/4642; G06K 9/6296; G10L 15/18; G10L 21/055; G10L 25/30; G10L 15/22; G10L 15/063; G10L 15/08; G10L 15/26; G10L 17/22; G10L 15/1815; G10L 15/16; G10L 15/14; G10L 17/04; G10L 17/24; G10L 2015/226; G06Q 30/0247; G06Q 30/0255; G06Q 30/0267; G06Q 30/0269; G06Q 30/0261; G06Q 30/0254; G06Q 50/01; G06T 2215/00; G06T 3/00; G06T 2207/20084; G06T 7/0004; G06T 7/70; G06T 7/11; G06T 2200/24; G06T 2207/20081; G06T 5/50; G06T 2207/10024; G06T 7/251; G06T 7/75; G06T 9/002; G06T 11/00; G06T 1/00
See application file for complete search history.

(56) References Cited

U.S. PATENT DOCUMENTS

| | | | |
|---|---|---|---|
| 2018/0308569 A1* | 10/2018 | Luellen | G16H 40/20 |
| 2019/0073353 A1* | 3/2019 | Yu | G06F 40/211 |
| 2019/0220524 A1 | 7/2019 | Costabello et al. | |
| 2019/0325275 A1* | 10/2019 | Lee | G06K 9/66 |

\* cited by examiner

MULTI-MODAL VISUAL QUESTION ANSWERING SYSTEM

TECHNICAL FIELD

This disclosure relates to visual question and answering and, in particular, to visual question and answering with artificial intelligence.

BACKGROUND

Visual question answering involves a computer resolving questions presented in an image and natural language format. For example, given an image and a natural language question about the image, the computer attempts to provide an accurate natural language answer. Traditional approaches to visual question answering support a limited range of questions, which are typically based on hard-coded templates. Moreover, traditional approaches to visual question answering provide limited predictive power.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
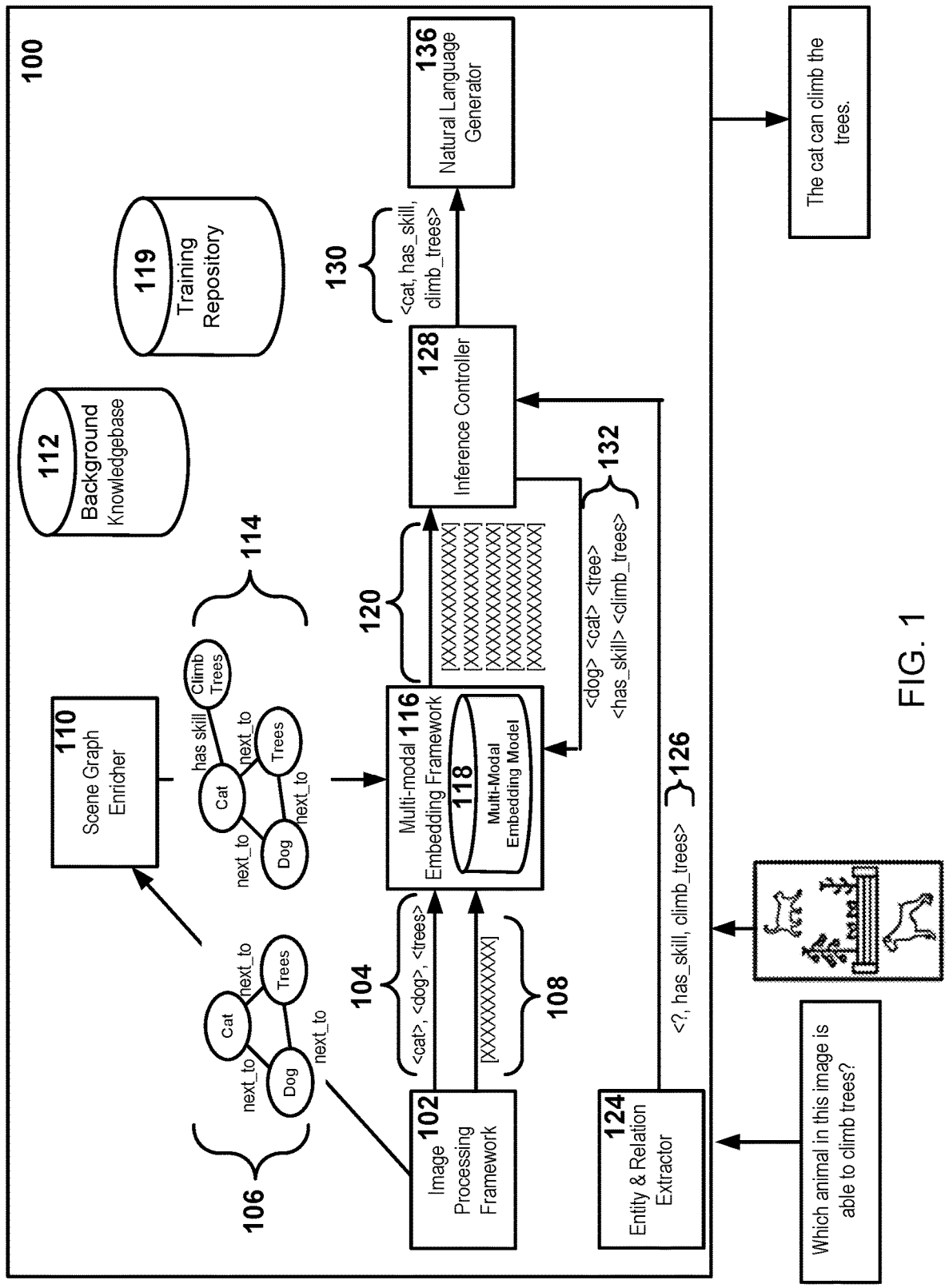
FIG. 1 illustrates a first example of a system for multi-modal visual query.

Visual question answering (VQA) involves a computer resolving questions presented in an image and natural language format. For example, given an image and a natural language question about the image, the computer attempts to provide an accurate natural language answer. Traditional approaches to visual question answering support a limited range of questions, which are typically based on hard-coded templates. The hard-coded templates require substantial effort to produce and maintain, resulting in VQA approaches that are inefficient, inaccurate and/or difficult to scale. Moreover, many existing VQA approaches fail to effectively support inferential question types. Literal questions have answers that are answered directly from the source material, e.g. Question: "What is under the umbrella?" Answer: "A man is under the umbrella". On the contrary, inferential questions are answered indirectly, or with other information, e.g. Question: "Why is the man under the umbrella?" Answer: "Because the sun is shining, and he will get sun-burned otherwise."

Accordingly, digital systems and methods for visual question answering based on multi-modal knowledge embeddings are described herein. By way of an introductory example, a system may receive an input image and a natural language query. The system may determine content classifications for portions of the input image. The system may generate a scene graph for the input image. The scene graph may include content classifications arranged in a graph data structure. The graph data structure may include nodes and edges. The nodes may respectively represent of the content classifications for the input image and the edges may represent relationships between the content classifications;

The system may generate, based on the input image and the scene graph, multi-modal embeddings. The multi-modal embeddings may be respectively associated with the nodes, the edges, or any combination thereof.

To generate at least a portion of the multi-modal embeddings, the system may determine symbolic embeddings for the content classifications of the input image. The symbolic embeddings may be representative of nodes of the scene graph, edges of the scene graph, or any combination thereof. The system may determine a sub-symbolic embedding for the input image. The sub-symbolic embedding may include an image feature vector for the input image. The system may identify separate portions of the image feature vector that are representative of the portions of the input image. The system may generate weighted sub-symbolic embeddings for each of the content classifications by applying weight values to the separate portions of the image feature vector. The system may aggregate the symbolic embeddings with the weighted sub-symbolic embeddings to form at least the portion of the multi-modal embeddings.

The system may generate a natural language response to the natural language query based on the multi-modal embedding. To generate the natural language response, the system may generate an inference query based on the natural language query. The inference query may be indicative of at least one of the content classifications. The system may select, from the multi-modal embeddings, particular multi-modal embeddings associated with at least one of the content classifications. The system may determine an inference statement based on a distance measurement between the particular multi-modal embeddings. The system may determine the natural language response based on the inference statement. The system may display in response to receipt of the natural language query and the input image, the natural language response.

An example of a technical advancement achieved by the systems and methods described herein may be that computer vision techniques and background knowledge sources may enhanced predictive power for VQA. Sub-symbolic features may be trained jointly with symbolic features to establish associations between and across sub-symbolic and symbolic features that might not otherwise be discoverable. These associations may include, for example, visually similar objects that are similar, even if not explicitly stated or inferred at the symbolic level. The sub-symbolic embeddings may be generated with computer vision processing. The symbolic features may include mathematical representations of image content, which are enriched with information from background knowledge sources. The system may generate multi-modal embeddings with the sub-symbolic features and the symbolic features. The system may aggregate the sub-symbolic and symbolic features using aggregation techniques such as concatenation, averaging, summing, and/or maxing. The multi-modal embeddings may be included in a multi-modal embedding model and trained via supervised learning. Once the multi-modal embeddings are trained, the system may generate inferences based on linear algebra operations involving the multi-modal embeddings that are relevant to an inference response to the natural language question and input image.

The systems and methods described herein offer improvements over existing market solutions. The additional benefits, efficiencies, and improvements over existing market solutions are made evident in the systems and methods described below.

FIG. 1 illustrates a first example of a system 100 for multi-modal visual query. The system 100 may receive an input query and an input image. The input query may include a structured or unstructured query about information included in the input image. The input query may include a natural language question in text format. The natural language text may include unstructured text in natural language format. The input image may include image data, such as a picture or video frame. In some examples, the image may include an image file and/or image data encoded as a PNG, JPG, or some other suitable image data format. The input image and/or natural language query may be communicated to the system via an application-programming interface (API), a message broker, representational state transfer (REST), and/or some other suitable communication technology.

The system may generate a response the input image and input query. The response may include a structured or unstructured answer to the query. In some examples, the response may include a natural language text. In some examples, the response may be communicated to a display interface and displayed in a graphical user interface. Alternatively or in addition, the response may include instructions, such has information in hyper-text markup language (HTML) format, to display natural language text on a remote device.

In the example illustrated in FIG. 1, the input query includes the natural text "Which animal in this image is able to climb trees," and the input image includes a picture of various content, including a cat, dog, fence, trees, etc. In the input image, the cat is on top of the trees. The response includes the text "The cat can climb the trees," which is the natural language answer to the natural language question. While FIG. 1 illustrates an example of the query, input image, and response, it should be appreciated that the input query, input image, and/or response may include other examples as well. In general, the input image may include any image where content in the image may be semantically classified. The input query may include a structured or unstructured interrogatory related to the input image. The response may include any information responsive to the natural language query.

The system 100 may include an image-processing framework 102. The image-processing framework 102 may apply computer vision techniques to generate a symbolic representation of information in the input image. The symbolic representations may include associations between the content in input image with one or more classification, relationship, and/or location of the content in the image. For example, the symbolic representation of the input image may include one or more content classifications 104 and/or a scene graph 106.

A content classification may include a categorization of the semantic meaning of information included in image data. For example, the content classification may include a type or category of an object, an action, and/or a scene detected in the content (i.e. image data) of the input image. The content classifications 104 illustrated in the FIG. 1 includes <cat>, <dog>, and <trees> for the cat, dog, and trees detected in the input image. In some examples, the content classification may include (or may be associated with) location information corresponding to the underlying image content. For example, the location information may include coordinates and/or pixel location(s) that identify a region of the input image that corresponds to an object shown in the image.

The scene graph 106 may include a multi-relational graph inducing nodes and edges. The nodes may represent the content classified from the image and the edges may represent the relations between the classified content. For example, the scene graph 106, illustrated in FIG. 1, includes the nodes labeled <cat>, <dog>, and <trees>, which are interconnected via the edges labeled <next_to>.

Figure 2:
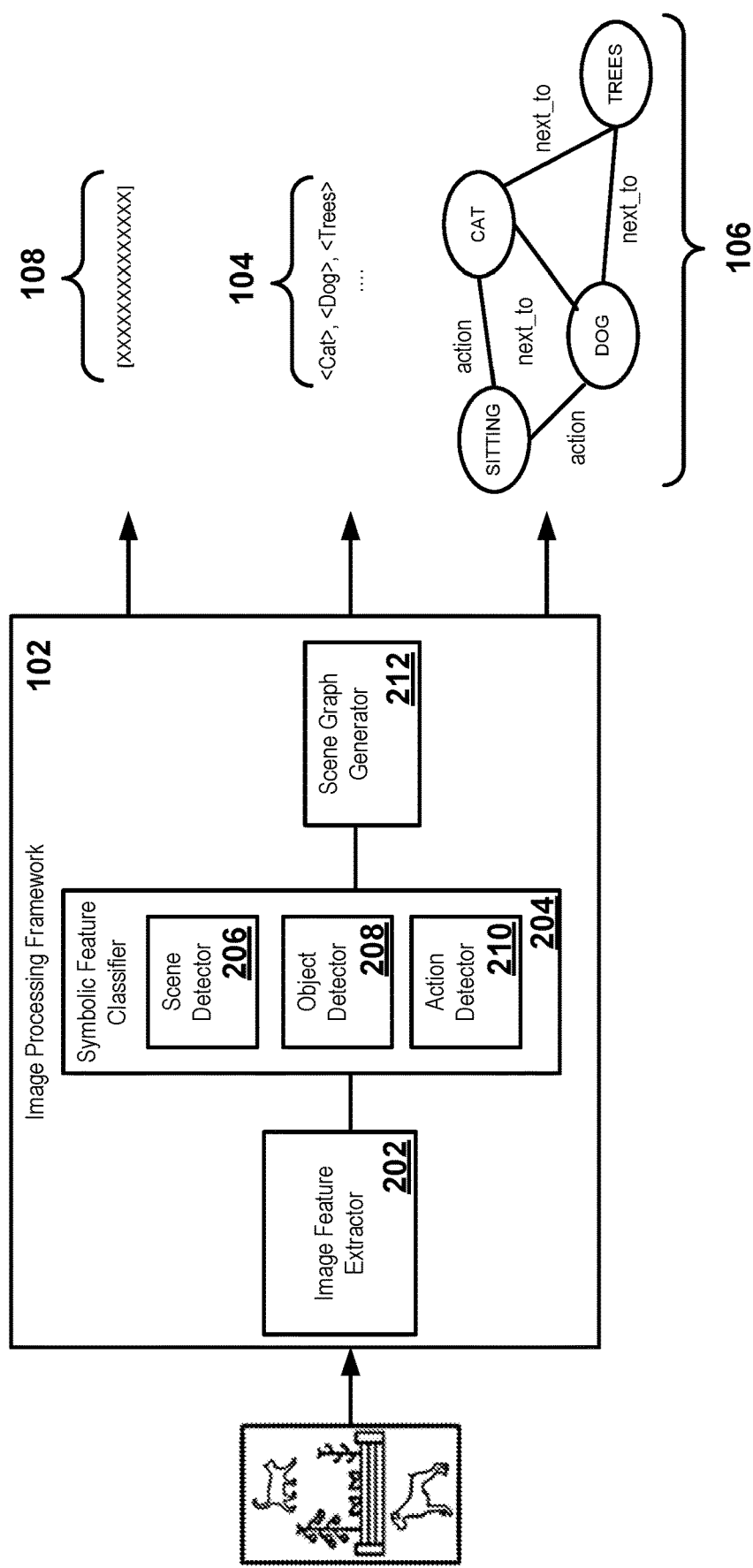
FIG. 2 illustrates an example an image-processing framework.

The image-processing framework 102 may generate a sub-symbolic representation of the input image. For example, the image-processing framework 102 may generate sub-symbolic embedding(s) 108 in a sub-symbolic embedding space. The sub-symbolic embeddings 108 may include, for example, one or more image feature vectors. In some examples, the sub-symbolic embedding(s) may include one or more image feature vector. The image feature vector(s) may include a flattened one dimensional feature vector representative of the entire input image, or a portion thereof. Alternatively or in addition, the image feature vectors(s) 108 may include stacked two-dimensional vectors from, for example, layers of a convolutional neural network. FIG. 2, and the related description, describes additional details regarding the image-processing framework 102.

Figure 3:
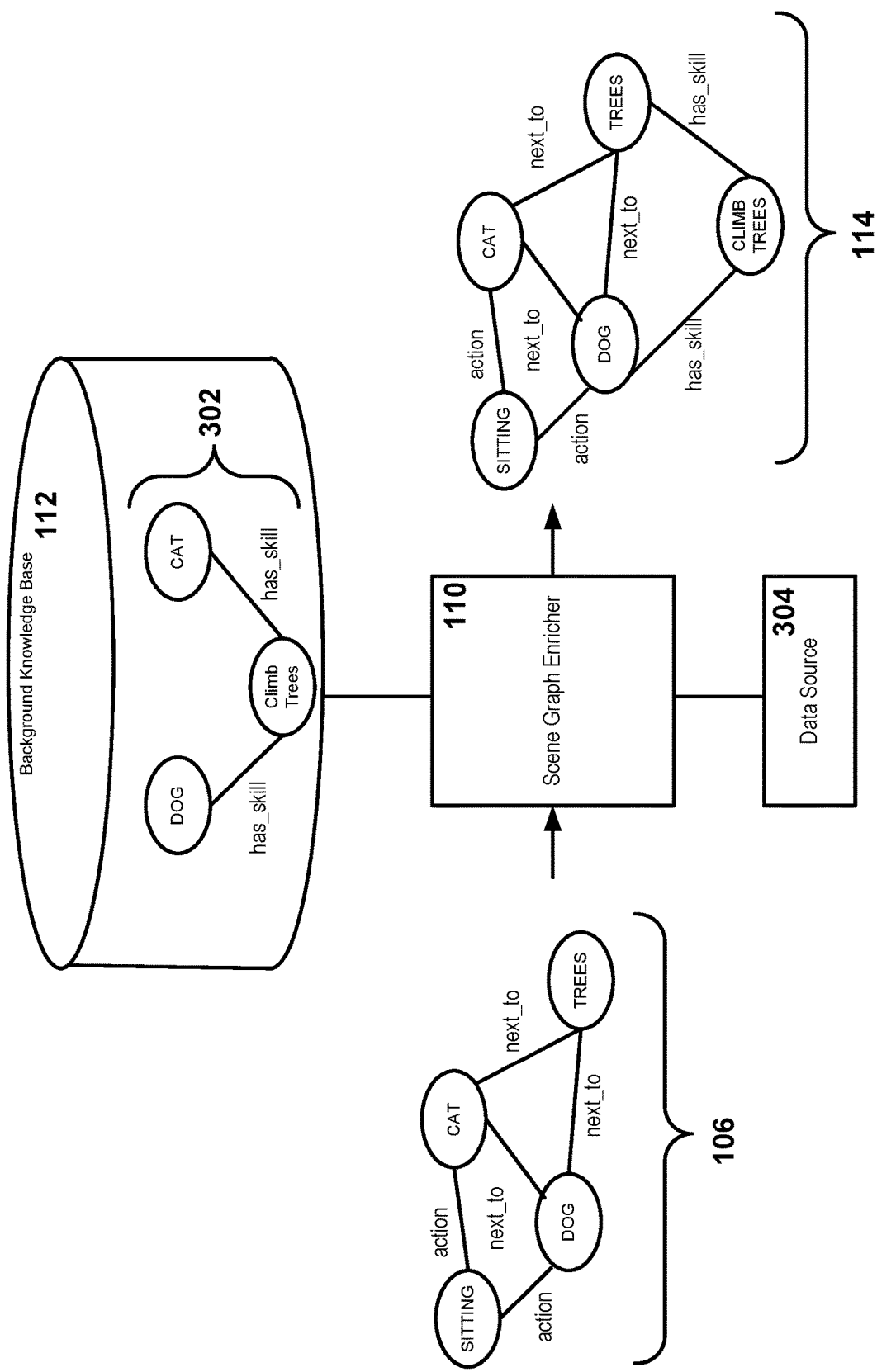
FIG. 3 illustrates an example of a scene graph enricher.

The system may include a scene graph enricher 110. The scene graph enricher 110 may enrich the scene graph 106 with additional nodes and/or edges. For example, the scene graph enricher 110 may determine the additional nodes or edges from a background knowledgebase 112. In some examples, the background knowledgebase 112 may include a knowledge graph with the additional nodes and/or edges. For example, scene graph enricher 110 may search the knowledge graph nodes and/or edges associated with content included in the scene graph 106. The scene graph enricher 110 may generate an enriched scene graph 114 with the additional nodes and/or edges. In the example illustrated in FIG. 1, the enriched scene graph 114 includes the additional node <climb_trees> and the additional edge <has_skill>. Additional or alternative types of nodes, edges, and other and scene graphs and/or enriched scene graphs are possible. FIG. 3, and the related description, provides additional discussion regarding the scene graph enricher 110.

The system may include a multi-modal embedding framework 116. The multi-modal embedding framework 116 may generate and/or manage a multi-modal embedding model 118. The multi-modal embedding model 118 may derive multi-modal embeddings trained according to a supervised learning approach. The multi-modal embeddings may include an aggregation of the symbolic embeddings and the sub-symbolic embeddings 108. Symbolic embeddings may include embeddings generated from symbolic representations of input images, enriched scene graphs and/or the content classifications. For example, the symbolic embeddings may include the nodes and/or edges of the enriched scene graph 114 embedded in an N-dimensional embedding space. The sub-symbolic embeddings 108 may include image features embedded into an O-dimensional embedding space. The aggregation of the symbolic embeddings with the sub-symbolic embeddings 108 may include combining the symbolic embeddings with the sub-symbolic embeddings 108 to generate the multi-modal embeddings in a P-dimensional embedding space. Each multi-modal embedding may be mapped to or associated with a corresponding node or edge of the enriched scene graph 114 and/or a corresponding content classification of the content classifications 104.

During training, the multi-modal embedding framework 116 may generate the multi-modal embedding model 118.

For example, the multi-modal embedding framework 116 may receive training information including, scene graphs, entity classifications, image embeddings, and/or annotated information to generate the multi-modal embedding model 118. The training information may be accessed from a training repository 119. The training repository may include a database, a file, or so or some other grouping of storable information accessed to perform training.

Figure 4:
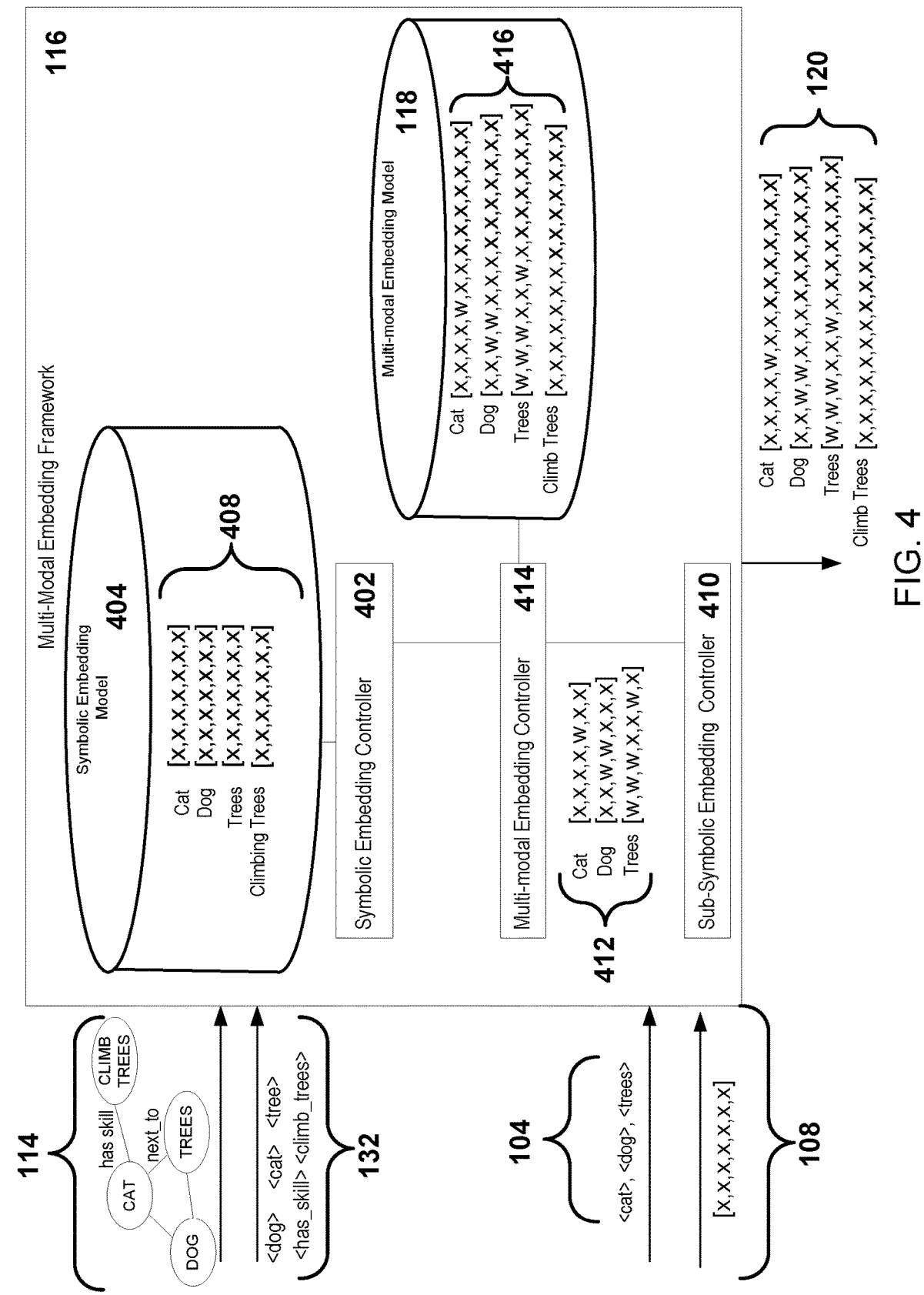
FIG. 4 illustrates an example of a multi-modal embedding framework.

During inference, the multi-modal embedding framework 116 may receive the embedding query 132 for multi-modal embeddings associated with specific content classifications, scene graph nodes, and/or scene graph edges. The multi-modal embedding framework 116 may identify an embeddings result set 120 having specific multi-modal embeddings based on the query and the multi-modal embedding model 118. FIG. 4, and the related description, provides additional discussion regarding the multi-modal embedding framework 116.

The system 100 may include an entity-relation extractor 124. The entity-relation extractor 124 may receive the natural language query and convert the natural language query into an inference query 126. The inference query 126 may include a query for an inference based on content classification(s) or relationships between content classifications. For example, the inference query 126 may include a formatted a structured syntax where parameters include labels for node(s) and/or edges(s) of the enriched scene graph 114. Alternatively or in addition, the inference query 126 may include a candidate field indicative of the node and/or edge being searched for. In the example illustrated in FIG. 1, the entity and relationship extractor may convert the unstructured query "Which animal in this picture is able to climb trees?" to the inference query <?, has_skill, climb_trees>, where has_skill corresponds to an edge in the enriched scene graph 114, climb_trees corresponds to a node in the enriched scene graph 114 and ? corresponds to a node or edge of the enriched scene graph 114 to be identified.

The system may include an inference controller 128. The inference controller 128 may generate an inference response 130 based on the inference query 126. The inference response 130 may include an inference (i.e. answer) to the inference query 126. The inference response 130 may be based multi-modal embeddings. For example, the inference controller 128 may generate the embedding query 132. The multi-modal embedding query 132 may include identifiers or labels corresponding to the content classifications 104 and/or the node/edges of the enriched scene graph 114. The inference controller 128 may receive an embeddings result set 120 from the multi-modal embedding model 118. The embedding results set may include particular multi-modal embeddings associated with the content classifications indicated by the embedding query 132. The inference controller 128 may measure distances between the particular multi-modal embeddings in the embeddings result set 120 and perform other scoring operations to determine the inference response 130.

Figure 5:
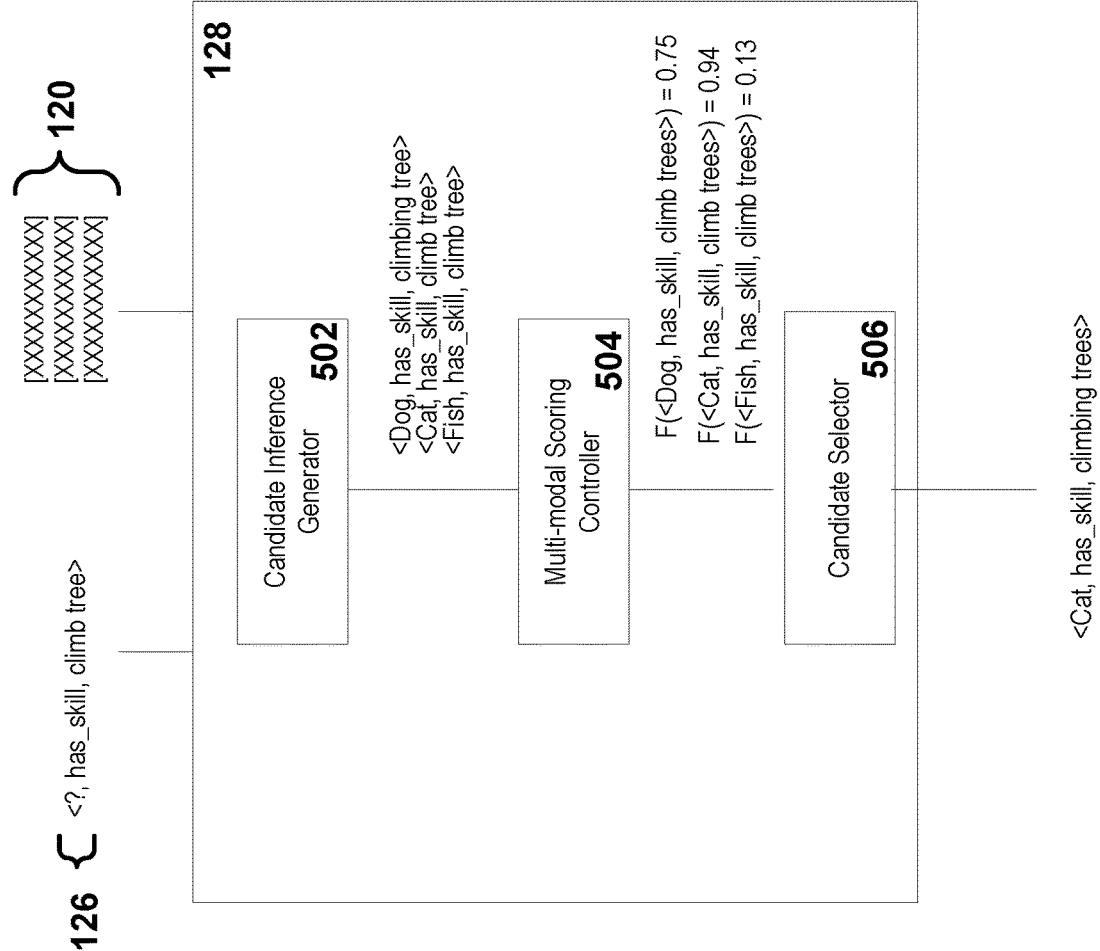
FIG. 5 illustrates an example of an inference controller.

In the example illustrated in FIG. 1, the inference controller 128 receives the inference query 126 with parameters <?, has_skill, climb_trees>. The inference controller 128 generates the embedding query 132 with the content classifications <dog>, <cat>, <tree>, <has_skill>, and <climb_trees>. The multi-modal embedding framework 116 may return the embeddings results set 120 for the content classifications specified in the embedding query 132. For example, the multi-modal embedding framework 116 may determine the respective multi-model feature vectors for <dog>, <cat>, <fish>, <has_skill>, and <climb_trees>. The inference controller 128 may determine, based in distance scoring between one or more of the specific multi-modal embeddings included in the embedding results set 120, that <cat> is the best replacement for "?" in the inference query 126. Accordingly the inference response 130 may include <cat, has, skill, climb_trees>, where "?" is replaced with <cat>. FIG. 5, and the related description, provides additional discussion regarding the inference controller 128.

The system may include a natural language generator 136. The natural language generator 136 may convert the inference response 130 into natural language text. For example, the natural language generator may convert the inference response <cat, has_skill, climb_trees> into "The cat can climb the trees."

FIG. 2 illustrates an example the image-processing framework 102. The image-processing framework 102 may include an image feature extractor 202. The image feature extractor 202 may generate the sub-symbolic embedding(s) 108 of the input image. The sub-symbolic embedding(s) 108 may include a numerical representation of content features of the input image. For example, the numerical representation may include a flattened vector, a stacked matrix (e.g. from a layer of a convolutional neural network), or any other suitable mathematical representation of the input image.

The image-processing framework 102 may include a symbolic feature classifier 204 to generate symbolic representations of the input image. The symbolic feature classifier 204 may generate the content classifications 104. For example, the symbolic feature classifier 204 may access an artificial intelligence neural network, such as a convolutional neural network and/or a recurrent neural network to identify objects, actions, and/or scenes. In the example illustrated in FIG. 2, the symbolic feature classifier 204 generates the content classifications <cat>, <dog>, <trees>. The symbolic feature classifier 204 may associate location information, such as pixel(s), regions, and boundaries of the image data with the content classifications.

The symbolic feature classifier 204 may include a scene detector 206, an object detector 208, and/or an action detector 210. The scene detector 206 may detect image data related to a scene of a picture. For example, the scene detector 206 may identify weather, landscapes, etc. The object detector 208 may generate objects in image data. The action detector 210 may detect certain actions occurring in the image detector. In the example illustrated in FIG. 2, the scene detector may generate a content classification labeled <trees>. The object detector 208 may generate the content classifications labeled <dog> and <cat>. The action detector 210 may generate <sitting>.

The image-processing framework 102 may further include a scene graph generator 212. The scene graph generator 212 may receive the entity classifications and generate the scene graph 106. As previously discussed, the scene graph 106 may include nodes and edges. The edges may interconnect the nodes such that each edge connect to at least two nodes. The nodes may represent objects, actions, scenes, or other features of the input image. The edges may represent relationships between nodes. For example, the edges may represent spatial relationships (i.e. next_to), sequential relationships (e.g. before, after), possessive relationships (e.g. has_skill), action relationships (e.g. action), and other types of relationships. The scene graph 106 may be generated with The image-processing framework 102 may provide the sub-symbolic embeddings 108, the content classifications 104, the scene graph 106, and/or any other example of symbolic or sub-symbolic representations of information included in the input image. The quantity and quality of the content classifications and relationships identified by the image-processing framework 102 may be limited by the technologies, models, and image content itself. For example, the quality of the image may hinder accurate detection and classification of content included in the image. Alternatively or in addition, the input image may include content or relationships that are not detectable though image processing, but are available through other information sources. The scene graph 106 may be enriched with information from additional sources.

FIG. 3 illustrates an example of the scene graph enricher 110. The scene graph enricher 110 may append nodes and/or edges to the scene graph 106 based on information provided in the background knowledgebase 112. The background knowledgebase 112 may include a source of information that may be narrowed based on search criteria. The background knowledgebase 112 may include, for example, a database, file, or some other data source that stores indexed information.

In some examples, the background knowledgebase 112 may include a knowledge graph 302 or multiple knowledge graphs. The knowledge graph 302 may include a data structure where information is organized into nodes and/or edges. The scene graph enricher 110 may query the knowledge graph 302 based on labels, or other relevant information, from the nodes and/or edges of the scene graph 106. The scene graph enricher 110 may identify corresponding nodes that are included in both the knowledge graph 302 and the scene graph 106. The scene graph enricher 110 may select nodes and/or edges from the knowledge graph 302 that are proximate to the corresponding nodes and/or edges. The scene graph enricher 110 may append the selected nodes and edges to the scene graph 106 to generate the enriched scene graph 114.

By way of example, the scene graph 106 may include the nodes <cat> and <tree>, which are interconnected based on the edge <next_to>. The scene graph enricher 110 may generate a query with the terms "cat", "tree" and/or "next to". The scene graph enricher 110 may identify, based on the query, the nodes <dog>, <cat> as corresponding nodes in the knowledge graph 302. The scene graph enricher 110 determine that the node <climb_trees> is mapped to the nodes <dog> and <cats> by way of the edges <has_skill>. The scene graph enricher 110 may append the node <climb_trees> to the scene graph 106 and then map the node <dog> and the node <cat> to the node <climb_trees> by way of edge <has_skill>.

In some examples, the scene graph enricher 110 may build and/or update the knowledge graph 302 by searching sources for new or updated information. For example, the scene graph enricher 110 may search a data source 304 based on information. The data source may include, for example, a semantic knowledge database or network (e.g. Yago, Conceptnet), a online encyclopedia (DBpedia, Wikipedia), a domain-specific relationship database management system, and/or any other source of information. The scene graph enricher 110 may generate queries that includes information from the nodes and/or edges of the knowledge graph 302.

FIG. 4 illustrates an example of the multi-modal embedding framework 116. The multi-modal embedding framework 116 may include a symbolic embedding controller 402 and/or a symbolic embedding model 404.

During training, the symbolic embedding controller 402 may train the symbolic embedding model 404. For example, the symbolic embedding controller 402 may receive the enriched scene graph 114, or other scene graph(s), as training data. The scene graph(s) may be converted into symbolic embeddings 408 in a symbolic embedding space. The symbolic embedding model 404 may store the symbolic embeddings 408. The symbolic embeddings 408 may include vectors that are weighted to achieve a desired outcome based on the training data. In other words, the each node and/or edge of the scene graph(s) may correspond to a point in an embedding space. The points for each node and/or edge may be adjusted within the embedding during supervised learning.

By way of example, the symbolic embedding model 404 may be trained based on the enriched scene graph 114. The enriched scene graph 114 may include the nodes and edges labeled <cat>, <dog>, <trees>, and <climb_trees>. The symbolic embeddings generated for the enriched scene graph 114 may include separate P dimensional vectors respectively mapped to <cat>, <dog>, <trees>, and <climb_trees>.

During inference, the symbolic embedding controller 402 receive may the embedding query 132. The embedding query 132 may include identifiers of nodes and/or edges of in the enriched scene graph 114. The symbolic embedding controller 402 may select one or more symbolic embeddings in the symbolic embedding model 404 that are associated with the identifiers of the nodes and/or edges identified by the embedding query 132. By way of example, the symbolic embedding controller 402 may receive an embedding query that includes the identifiers for <dog>, <cat>, <has skill>, and <climb_trees>. The embedding controller may identify the vectors embeddings respectively associated with <dog>, <cat>, <has skill>, and <climb_trees>.

The multi-modal embedding framework 116 may include a sub-symbolic embedding controller 410. The sub-symbolic embedding controller 410 may align sub-symbolic embedding(s) 108 with regions of the input image that include visual features. For example, the sub-symbolic embedding controller 410 may receive the sub-symbolic embeddings 108 and the content classifications 104 of an input image. As previously discussed, the content classifications may include (or may be associated with) coordinates of pixels where the contents in the input image are located. For example, the content classifications may include (or be associated with) respective regions in the input image. The sub-symbolic embedding controller 410 may weigh portion of the sub-symbolic embedding(s) 108 that correspond to the respective regions of the input image. Weighing the sub-symbolic embedding(s) may occur via binary masking, weighing, learned weighting via spatial convolution, or some other weighing technique. The sub-symbolic embedding controller 410 may generate weighted sub-symbolic feature embeddings 412 for each content classification.

The multi-modal embedding framework 116 may include a multi-modal embedding controller 414. The multi-modal embedding controller 414 may combine the symbolic embeddings 408 with the weighted sub-symbolic embeddings 412 to generate multi-modal embeddings 416. In general, a multi-modal embedding may include a mapping between a content classification (.e.g. cat, dog, tree, etc.) and a multi-modal feature vector. The multi-modal feature vector may include an aggregation of the symbolic embedding 408 and a weighted sub-symbolic image embeddings 412. The aggregation may occur via concatenation, summing, averaging, maxing, or any other combination technique. The multi-modal embedding controller may store the multi-modal embeddings in the multi-modal embedding model 118.

Table 1 illustrates an example of the multi-modal embeddings 416 generated by concatenation. As shown in FIG. 4, each multi-modal embedding is a concatenation of a weighted sub-symbolic embedding and a symbolic embedding. In the example illustrated in FIG. 4, the x's may represent real numbers and the w's may represent weighted real numbers.

TABLE 1

Mutli-modal Embeddings Example

| Content Classification | Weighted Image Embedding | Scene Graph embedding | Multi-modal Vector |
|---|---|---|---|
| <cat> | [x, x, x, x, w, x, x] | [x, x, x, x, x, x, x] | [x, x, x, x, w, x, x, x, x, x, x, x, x, x] |
| <dog> | [x, x, w, w, x, x, x] | [x, x, x, x, x, x, x] | [x, x, w, w, x, x, x, x, x, x, x, x, x, x] |
| <tree> | [w, w, w, x, x, w, x] | [x, x, x, x, x, x, x] | [w, w, w, x, x, w, x, x, x, x, x, x, x, x] |
| ... | ... | ... | ... |

During training, the mutli-modal embedding controller 414 may generate the multi-modal embedding model 416 by aggregating symbolic embeddings and sub-symbolic embeddings generated based on training data. The generated multi-modal embeddings may be stored in the multi-modal embedding model 118. During inference, the multi-modal embedding controller may receive sub-symbolic embeddings and symbolic embeddings generated for a particular input image and input question. The multi-modal embedding controller may combine the sub-symbolic and symbolic embeddings to generate ad-hoc multi-modal embeddings for the particular input image and input question. The ad-hoc multi-modal embeddings are compared to the trained multi-model embeddings to determine embeddings to include in the result set 120.

By way of example, the multi-modal embedding model 118 may include a trained multi-modal embedding for the content classification <cat>. During inference, the multi-modal embedding controller 414 may receive a symbolic embedding and a sub-symbolic embedding for the content classification <cat> in a particular input image. The multi-modal embedding controller may generate an ad-hoc multi-modal embedding for <cat> by combining (i.e. concatenation, summing, averaging, etc.) the sub-symbolic embedding with the symbolic embedding. The multi-modal embedding controller may determine the distance between the ad-hoc mutli-modal embedding for <cat> and the trained multi-modal embedding for <cat> are less than a threshold distance value. In response, the multi-modal embedding controller may include the ad-hoc multi-modal embedding for <cat> and/or the trained multi-modal embedding for <cat> in the results set 120.

FIG. 5 illustrates an example of the inference controller 128. The inference controller 128 may include a candidate inference generator 502. The candidate inference generator 502 may generate a plurality of candidate inference statements based the inference query 126. The inference query 126 may include one or more content classifications and one or more candidate field. The content classifications may include, for example, nodes and/or edges of a scene graph. The candidate field may include a value indicative of the content classification to be identified. By way of example, the inference query 126 shown in FIG. 5 is <?, has_skill, climb_trees>. The inference query 126 includes the candidate field denoted "?" and the content classificaitons "has_ skill" and "climb trees." The pseudo interpretation of the inference query 126 is "What content in the input image has skills for climbing trees."

The candidate inference generator 502 may generate a plurality of inference statements based on the inference query 126. The inference statements may include statements regarding associations between content classifications. For example, the inference statement may include a statement regarding the structure of nodes and/or edges of a scene graph. By way of example, Table 2 shows examples of various inference statements and their pseudo interpretations.

TABLE 2

Inference Statement Examples

| | |
|---|---|
| <dog, __has_skill, climb_trees> | The dog has the skill of climbing trees |
| <cat, has_skill, climb_tree> | The cat has the skill of climbing trees |
| <tree, has_skill, climb_tree> | The tree has the skill of climbing trees |

Since the inference statements include content classifications, multi-modal embeddings associated with the content classifications may provide an embedding space in which the validity of each statement may be scored.

The inference controller 128 may include a multi-modal scoring controller 504. The multi-modal scoring controller 504 may access multi-modal embeddings that are respectively mapped to each content classification in the candidate statements. In some examples, the multi-modal scoring controller 504 may extract an identifier of each unique content classification (i.e. node or edge of a scene graph) referenced in the candidate statements and then select the corresponding multi-modal embedding for each content classification a multimodal embedding space After each of the multi-modal embeddings have been identified, the multi-modal scoring controller 504 may score the validity of each statement based on distance on the results set 120. For example, the multi-modal scoring controller 504 may select, from the embeddings result set 120, the mutli-modal embeddings associated with each inference statement. The multi-modal scoring controller 504 may calculate a score based on linear algebra distance calculations, such as a dot product, between each of the embeddings for each of the candidate inference statements. In some examples, the calculated distance score may be applied in a scoring function that assigns a value in a scoring range (e.g. between 0 and 1).

The inference controller 128 may include a candidate selector 506. The candidate selector 506 may select at least one of the candidate inference statements based on the calculated scores for each inference statement. For example, the candidate selector 506 may rank the candidate inference statements based on the score. In some examples, the candidate selector 506 may select the candidate inference statement(s) associated with a score higher than a threshold value. Alternatively, the candidate selector 506 may select the candidate inference statement associated with the highest score (e.g. the shortest distance between multi-modal embeddings).

Figure 6:
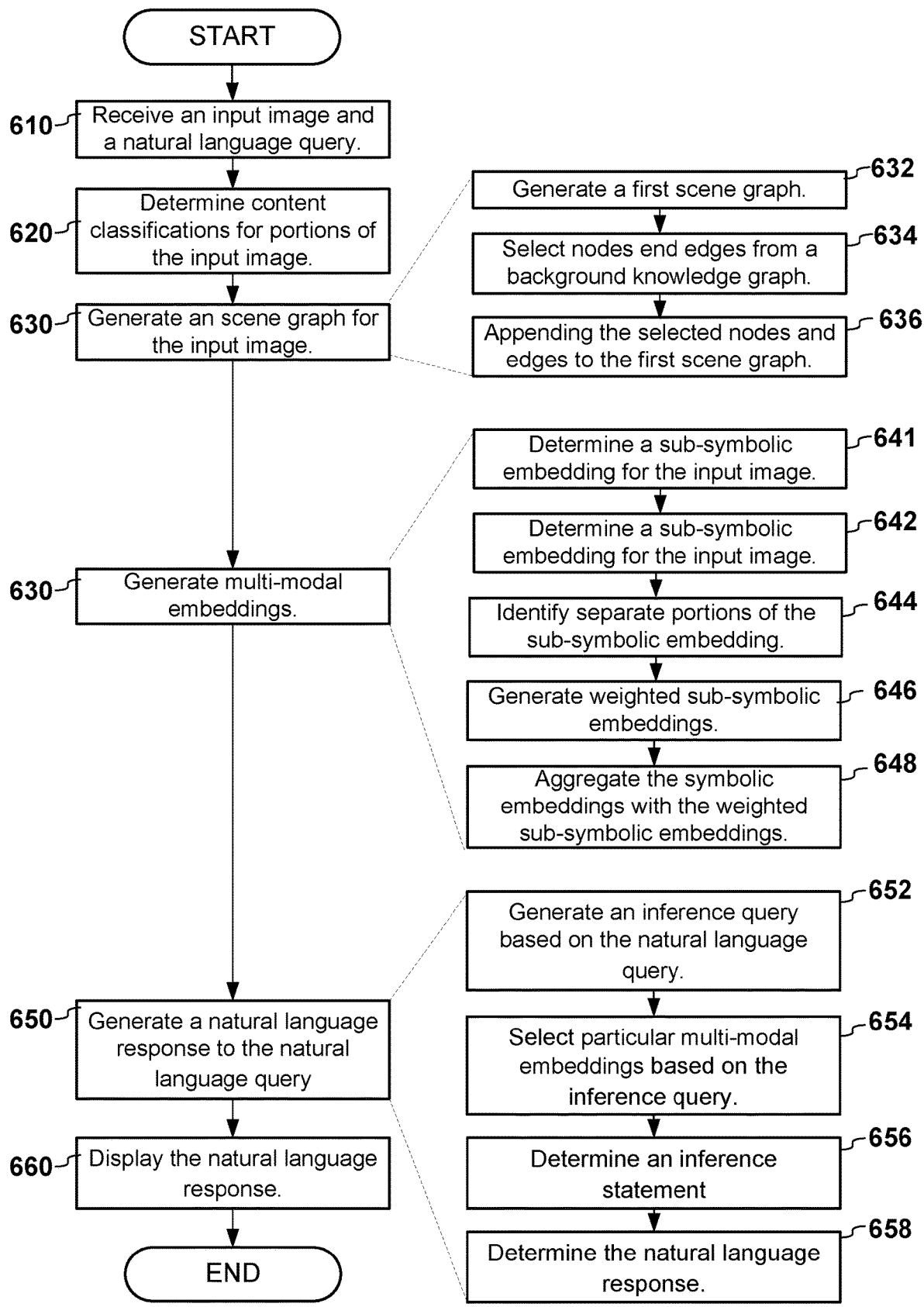
FIG. 6 illustrates a flow diagram for a system.

FIG. 6 illustrates a flow diagram for the system 100. The steps may include additional, different, or fewer operations than illustrated in FIG. 6. The steps may be executed in a different order than illustrated in FIG. 6.

The system receive an input image and a natural language query (610). The input image and/or natural language query may be communicated to the system via application programming interface, a message broker, representational state transfer (REST), and/or some other suitable communication technology. In some examples, the system may receive a structured text query instead of a natural language query. The structured text query may include, for example, a procedural invocation, a message, and/or information passed in a structured format such as eXtensible Markup Language (XML).

The system may determine content classifications for portions of the input image (620). For example, the system may determine a portion of the image may include image data representative of an object, scene, action, or some other semantic categorization. The portion of the image may include a location or region of the image defined by coordinates, such as pixel coordinates.

The system may generate the enriched scene graph 114 for the input image (630). To generate the enriched scene graph 114, the system may perform one or more of the operations 632-636 below.

The system may generate the scene graph 106 (632). The scene graph 106 may include content classifications arranged in a graph data structure. For example, the scene graph 106 may include nodes and edges. Each of the nodes may represent content at various regions in the input image. Each of the edges may represent a relationship between content. At least two of the nodes may be connected via at least one of the edges. The nodes may correspond to objects, actions, scenery, or other classifications of image content. The edges may correspond to relationships between the nodes.

The system may select nodes and edges from the background knowledge graph 302 (634). For example, the system may determine the node and/or edges of the scene graph 106 correspond to (i.e. match) certain nodes of the background knowledge graph 302. The system may select nodes and/or edges that are proximate to or connected with the matching node in the background knowledge graph 302. The selected nodes and/or edges may not be included in the scene graph 106.

The system may append the selected nodes and/or edges to the scene graph 106 to generate the enriched scene graph 114 (636). For example, the system may add the selected noes and/or edges to the existing nodes and/or edges of the scene graph 106 to generate the enriched scene graph 116.

The system may generate mutli-modal embeddings (640). The multi-modal embeddings may be respectively associated with the nodes of the enriched scene graph 114, the edges of the enriched scene graph 114, or any combination thereof. To generate at least a portion of the multi-modal embeddings, the system may perform one or more of the operations 641-648 described below.

The system may determine symbolic embeddings 408 for the input image (641). In some examples, the system may store the symbolic embeddings 408 in a symbolic embedding model 404. The symbolic embedding model 404 may include a plurality of embeddings. Each embedding may be mapped to content classifications in the input images. The content classifications may be arranged as nodes or edges of the enriched scene graph 114. Thus, the symbolic embeddings may be queried based on identifiers of the nodes or edges of the enriched scene graph 114.

The system may determine the sub-symbolic embedding(s) 108 for the input image (642). The sub-symbolic embeddings may include one or more image feature vector. In some examples, the image feature vector(s) may include a flattened one dimensional feature vector representative of the entire input image. Alternatively or in addition, the image feature vectors(s) may include stacked two-dimensional vectors from, for example, layers of a convolutional neural network. Sub-symbolic embeddings may generated in the course of training a deep learning computer vision model (for example to detect cats in an image). The model may take a raw image (i.e. matrix of pixels) as an input, and, by applying successive convolution and pooling layers, arrive at an output that indicates that this image maps to a symbol objects (e.g. 'cat'). Convolution and pooling layers may produce a hierarchy of feature vectors, that in each layer maps from lower to higher level features, e.g. raw pixel→edge/line/blob detection→color blob detection→texture and object shape features→symbolic objects (cat). Any of the feature vectors preceding the models decision that the input maps to the symbol 'cat' can be thought of as sub-symbolic. A learned subset of these sub-symbolic feature vectors may be extracted from the layers preceding the decision layer of the model, and used as a sub-symbolic representation of the object itself.

The system may identify separate portions of the sub-symbolic embedding(s) 108 (644). For example, a sub-symbolic embedding may include an image feature vector, as previously discussed. The system may identify separate portions of the image feature vector. The separate portions of the image feature vector may be are representative of the portions of the input image that are associated with the content classifications. For example, the image feature vector may include image data, such as red, green, blue (RGB) values, or other pixel information, included in various portions or regions of the input image. Thus, for each content classification, the system may determine a portion of the image feature vector. The portion of the image feature vector may correspond to a portion of the input image that was classified with a particular content classification.

The system may generate weighted sub-symbolic embeddings 412 (646). For example, the weighted sub-symbolic embeddings may include weights or masks that are associated with the content classifications. Alternatively or in addition, may be determined based on a region of the input image that includes the content one or more of the content classifications. The weights or masked may be applied to the sub-symbolic embedding to generate the weighted sub-symbolic embeddings 412. For example, the sub-symbolic embedding 108 may include an initial image feature vector. In some examples, the initial image feature vector may include flattened one-dimensional vector representative of the entire image or a stacked two-dimensional matrix from a layer of a convolutional neural network. The system may identify separate portions of the initial image feature vector. The separate portions of the image feature vector being representative of the portions of the input image and/or the content classifications 104 for the input image. The system 100 may apply weight values to the separate portions of the image feature vector. The system 100 may extract the separate weighted portions of the image feature vector. The system may weighted image feature vectors where each of the weighted image feature vector includes a separate one of the weighed portions of the image feature vector. In other words, the weight values may be applied to the separate portions of the image feature vector that were previously identified by operation 644. Multiple weighted image vectors may be generated according to the number of separate portions of the image feature vector.

The system may aggregate the symbolic embeddings 408 with the weighted sub-symbolic embeddings 412 (648). The aggregation of the symbolic and sub-weighted symbolic embeddings may occur via concatenation, summing, averaging, or any other combination technique.

The system may generate a natural language response to the natural language query (650). To generate the natural language response, the system may perform one or more of the operations 652-656.

The system may generating the inference query based on the natural language query (652). The inference query may be indicative of content classifications 104. The system may apply natural language understanding to identify the content classifications referenced in the natural language query. For example, the content classifications 104 may be associated with text, general expressions, synonyms, and other text recognition information representative of the content classifications. By way of example, the content classification <cat> may be associated with the text "cat", "kitten", etc. The system may determine that that the word "cat" in the natural language query is indicative of the content classification identified as <cat>. The inference query may include the content classification <cat> in the inference query.

The system may identify node(s) and/or edge(s) in the enriched scene graph 114 (652). For example, the system may compare text in the natural language query with the identifiers of the nodes and/or edges of the enriched scene graph 114 to identify edges and/or nodes of the enriched scene graph 114.

The system may select particular multi-modal embeddings based on the inference query 126 (654). For example, the system may select, from multi-modal embeddings, particular multi-modal embeddings associated with at least one of the content classifications identified in the inference query 126.

The system may determine an inference statement based on a distance measurement between the particular multi-modal embeddings (656). For example, the system may generate candidate statements, each of the candidate statements referencing one or more nodes and one or more edges of the enriched scene graph 114. The system may select groups of multi-modal embeddings based the one or more nodes and one or more edges identified in the candidate statements. The system may determine respective scores for the plurality of candidate statements based on distance measurements between multi-modal embeddings in each of the groups. The system may select, based on the respective scores, at least one of the candidate statements. Alternatively or in addition, the system may select a candidate statement associated with a highest one of the respective scores.

The system may generate the natural language response based on the inference statement (658). For example, the system may convert the inference statement (i.e. the selected candidate statement) into a natural language word or set of words (i.e. sentence). The system may apply natural language generation I.e. content determination, sentence structuring, aggregation, lexical choice, referring expression generation, etc.) to convert the inference statement into the natural language response.

The system may display the natural language response (660). For example, the system may communicate the natural language response to a device to display a graphical user interface. In some examples, the system may also communicate instructions to the device, which cause the device to display the natural language response.

The system 100 may be implemented with additional, different, or fewer components than illustrated. Each component may include additional, different, or fewer components.

Figure 7:
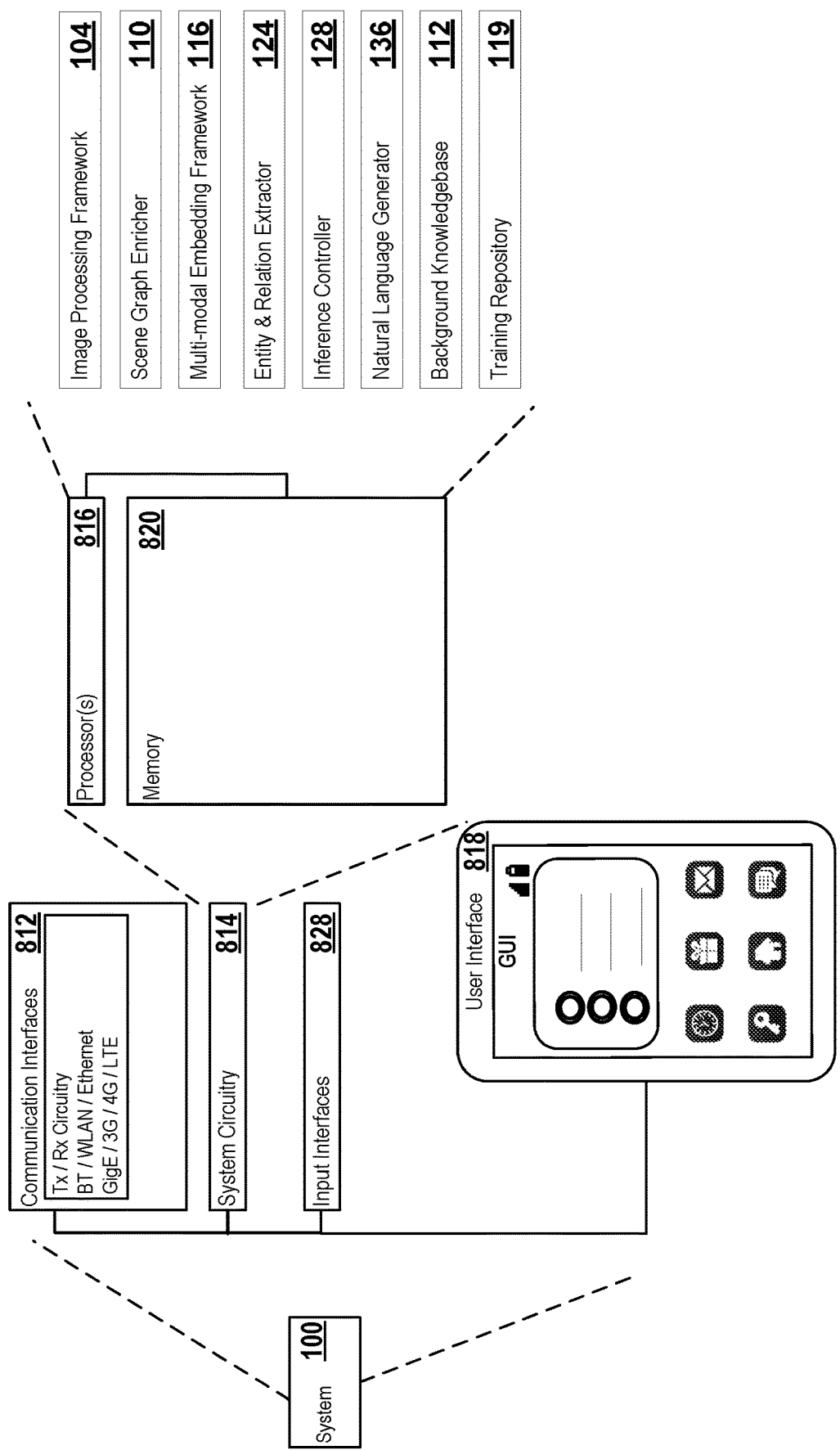
FIG. 7 illustrates a second example of a system.

FIG. 7 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the image processing framework 102, the scene graph enricher 110, the multi-modal embedding framework 116, the entity and relation extractor 124, the inference controller 128, the natural language generator 136, the background knowledge-base 112, the training repository 119 and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the image processing framework 102, the scene graph enricher 110, the multi-modal embedding framework 116, the entity and relation extractor 124, the inference controller 128, the natural language generator 136, the background knowledge-base 112, the training repository 119 and/or the system 100. Alternatively or in addition, the memory may include any other component or sub-component of the system 100 described herein.

The user interface 818 may include any device or interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions in various formats, such as HTML, Javascript, CSS, etc., to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the image processing framework 102, the scene graph enricher 110, the multi-modal embedding framework 116, the entity and relation extractor 124, the inference controller 128, the natural language generator 136, the background knowledgebase 112, the training repository 119, and/or the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each logic component may be interchangeably referred to as a hardware component.

Some features are shown stored in a non-transitory computer readable storage medium (for example, as logic implemented as computer executable instructions or as data structures in memory). All or part of the system and its logic and data structures may be stored on, distributed across, or read from one or more types of non-transitory computer readable storage media. Examples of the non-transitory computer readable storage medium may include a hard disk, a floppy disk, a CD-ROM, a flash drive, a cache, volatile memory, non-volatile memory, RAM, flash memory, or any other type of computer readable storage medium or storage media.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, or other hardware that holds information temporarily or permanently. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over infrastructure communication lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for visual question inference, the method comprising:
    receiving an input image and a natural language query;
    determining content classifications for portions of the input image;
    generating a scene graph for the input image, the scene graph including the content classifications arranged in a graph data structure comprising nodes and edges, the nodes respectively representative of the content classifications for the input image and the edges representative of relationships between the content classifications;
    generating multi-modal embeddings based on the input image and the scene graph, the multi-modal embeddings being respectively associated with the nodes, the edges, or any combination thereof, wherein at least a portion of the multi-modal embeddings are generated by:
        determining symbolic embeddings for the content classifications of the input image, the symbolic embeddings representative of nodes of the scene graph, edges of the scene graph, or any combination thereof;
        determining a sub-symbolic embedding for the input image, the sub-symbolic embedding comprising an image feature vector for the input image;
        identifying separate portions of the image feature vector that are representative of the portions of the input image;
        generating weighted sub-symbolic embeddings for each of the content classifications by applying weight values to the separate portions of the image feature vector;
        aggregating the symbolic embeddings with the weighted sub-symbolic embeddings to form at least the portion of the multi-modal embeddings;
    generating a natural language response to the natural language query based on the multi-modal embeddings by:
        generating an inference query based on the natural language query, the inference query indicative of the at least one of the content classifications;
        selecting, from the multi-modal embeddings, particular multi-modal embeddings associated with at least one of the content classifications;
        determining an inference statement based on a distance measurement between the particular multi-modal embeddings; and
        determining the natural language response based on the inference statement; and
    displaying, in response to receipt of the natural language query and the input image, the natural language response.

2. The method of claim 1, wherein aggregating the symbolic embeddings with the weighted sub-symbolic embeddings to form the multi-modal embeddings further comprises:
    concatenating a first vector from the symbolic embeddings with a second vector from the weighted sub-symbolic embeddings to form a multi-modal vector.

3. The method of claim 1, wherein determining an inference statement based on a distance measurement between the particular multi-modal embeddings further comprises:
    generating a plurality of candidate statements, each of the candidate statements referencing at least one node and at least one edge of the scene graph;
    selecting, from the multi-modal embeddings, groups of multi-modal embeddings based on the at least one node and the at least one edge of the scene graph;
    determining respective scores for the plurality of candidate statements based on distance measurements between multi-modal embeddings in each of the groups;
    selecting, based on the respective scores, at least one of the candidate statements; and
    generating the natural language response based on the selected at least one of the selected candidate statements.

4. The method of claim 3, wherein selecting, based on the respective scores, at least one of the candidate statements further comprises:
    selecting a candidate statement associated with a highest one of the respective scores.

5. The method of claim 1, further comprising:
    enriching the scene graph by appending additional nodes to the scene graph with nodes being sourced from a background knowledge graph; and
    generating the multi-modal embeddings based on the input image and the enriched scene graph.

6. The method of claim 5, wherein enriching the scene graph by appending additional nodes to the scene graph with the additional nodes being sourced from a background knowledge graph further comprises:
    identifying, in the background knowledge graph, a first node of the scene graph that corresponds to a second node of the background knowledge graph;
    selecting further nodes of the background knowledge graph that are connected with the second node of the background knowledge graph, wherein the selected further nodes are not included in the non-enriched scene graph; and
    appending the selected further nodes to the scene graph.

7. The method of claim 1, further comprising:
    generating a graphical user interface, the graphical user interface comprising the input image and a text field;
    determining that the natural language query was inserted into the text field; and
    updating the graphical user interface to include the natural language response.

8. A system for visual question inference, the system comprising:
    a processor, the processor configured to:
        receive an input image and a natural language query;
        generate a scene graph for the input image, the scene graph comprising content classifications of image data for the input image, the content classifications being arranged in a graph data structure comprising nodes and edges, the nodes respectively representative of the content classifications for the input image and the edges representative of relationships between the content classifications;

determine symbolic embeddings for the input image, the symbolic embeddings representative of nodes of the scene graph, edges of the scene graph, or any combination thereof;

determine a sub-symbolic embeddings for the input image, the sub-symbolic embeddings comprising respective image feature vectors for the input image;

aggregate the symbolic embeddings with the sub-symbolic embeddings to form multi-modal embeddings in a multi-modal embedding space;

identify at least one node and at least one edge in the scene graph based on natural language included in the natural language query, the natural language text being indicative of at least one of the content classifications;

select, from the multi-modal embeddings, particular multi-modal embeddings associated with the at least one of the content classifications;

determine an inference statement based on a distance measurement between the selected multi-modal embeddings;

generate a natural language response based on the inference statement; and display the natural language in response on a graphical user interface.

9. The system of claim 8, wherein to determine a sub-symbolic embeddings for the input image, the processor is further configured to:

determine at least a portion of the input image that corresponds to the content classifications;

generate an initial image feature vector for the input image;

identify separate portions of the initial image feature vector, the separate portions of the initial image feature vector being representative of the at least the portion of the input image;

apply weight values to the separate portions of the image feature vector;

extract the separate weighted portions of the image feature vector; and generate the respective image feature vectors of the sub-symbolic embeddings, wherein each of the respective image feature vectors comprise a corresponding one of the separate weighted portions of the image feature vector.

10. The system of claim 8, wherein to aggregate the symbolic embeddings with the sub-symbolic embeddings to form multi-modal embeddings in a multi-modal embedding space, the processor is further configured to:

concatenate a first feature vector from the symbolic embeddings with a second feature vector from the sub-symbolic embeddings to form a combined vector.

11. The system of claim 8, to determine an inference statement based on a distance measurement between the selected multi-modal embeddings, the processor is further configured to:

generate a plurality of candidate statements, each of the candidate statements referencing at least one node and at least one edge of the scene graph;

select, from the multi-modal embeddings, groups of multi-modal embeddings based on the at least one node and the at least one edge of the scene graph;

determine respective scores for the plurality of candidate statements based on distance measurements between multi-modal embeddings in each of the groups of multi-modal embeddings;

select, based on the respective scores, at least one of the candidate statements; and generate the natural language response based on the selected at least one of the candidate statements.

12. The system of claim 8, wherein the processor is further configured to:

enrich the scene graph by appending additional nodes to the scene graph with nodes being sourced from a background knowledge graph, wherein to enrich the scene graph, the processor is further configured to:

identify, in the background knowledge graph, a first node of the scene graph that corresponds to a second node of the background knowledge graph;

select further nodes of the background knowledge graph that are connected with the second node of the background knowledge graph, wherein the selected further nodes are not included in the non-enriched scene graph; and append the selected further nodes to the scene graph.

13. The system of claim 8, further wherein the weight value to be applied is wherein the scene graph is generated based on symbolic features in the input image.

14. The system of claim 8, further wherein the weight value to be applied is determined based on a region of the input image.

15. A non-transitory computer readable storage medium comprising computer executable instructions, the instructions executable by a processor to:

receive an input image and a natural language query;

generate a scene graph for the input image, the scene graph comprising content classifications of image data for the input image, the content classifications being arranged in a graph data structure comprising nodes and edges, the nodes respectively representative of the content classifications for the input image and the edges representative of relationships between the content classifications;

determine symbolic embeddings for the input image, the symbolic embeddings representative of nodes of the scene graph, edges of the scene graph, or any combination thereof;

determine a sub-symbolic embeddings for the input image, the sub-symbolic embeddings comprising respective image feature vectors for the input image;

aggregate the symbolic embeddings with the sub-symbolic embeddings to form multi-modal embeddings in a multi-modal embedding space;

identify at least one node and at least one edge in the scene graph based on natural language included in the natural language query, the natural language text being indicative of at least one of the content classifications;

select, from the multi-modal embeddings, particular multi-modal embeddings associated with the at least one of the content classifications;

determine an inference statement based on a distance measurement between the selected multi-modal embeddings;

generate a natural language response based on the inference statement; and display the natural language in response on a graphical user interface.

16. The non-transitory computer readable storage medium of claim 15, wherein the instructions executable by the processor to determine a sub-symbolic embeddings for the input image further comprise instructions executable by the processor to:
- determine portions of the input image that correspond to the content classifications;
- generate an initial image feature vector for the input image;
- identify separate portions of the initial image feature vector that are representative of the portions of the input image;
- apply weight values to the separate portions of the image feature vector;
- extract the separate weighted portions of the image feature vector; and
- generate the respective image feature vectors of the sub-symbolic embeddings, wherein each of the respective image feature vectors comprise a corresponding one of the separate weighted portions of the image feature vector.

17. The non-transitory computer readable storage medium of claim 15, wherein the instructions executable by the processor to aggregate the symbolic embeddings with the sub-symbolic embeddings to form multi-modal embeddings further comprise instructions executable by the processor to:
- concatenate a first feature vector from the symbolic embeddings with a second feature vector from the sub-symbolic embeddings to form a combined vector.

18. The non-transitory computer readable storage medium of claim 15, wherein the instructions executable by the processor to determine an inference statement based on a distance measurement between the selected multi-modal embeddings further comprise instructions executable by the processor to:
- generate a plurality of candidate statements, each of the candidate statements referencing at least one node and at least one edge of the scene graph;
- select, from the multi-modal embeddings, groups of multi-modal embeddings based on the at least one node and the at least one edge of the scene graph;
- determine respective scores for the plurality of candidate statements based on distance measurements between multi-modal embeddings in each of the groups of multi-modal embeddings;
- select, based on the respective scores, at least one of the candidate statements; and
- generate the natural language response based on the selected at least one of the candidate statements.

19. The non-transitory computer readable storage medium of claim 15, further comprising instructions executable by the processor to:
- enrich the scene graph by appending additional nodes to the scene graph with nodes being sourced from a background knowledge graph, wherein the multi-modal embeddings are based on the input image and the enriched scene graph.

20. The non-transitory computer readable storage medium of claim 19, wherein the instructions executable by the processor to enrich the scene graph by appending nodes to the scene graph with nodes from a background knowledge graph further comprise instructions executable by the processor to:
- identify, in the background knowledge graph, a first node of the scene graph that corresponds to a second node of the background knowledge graph;
- select further nodes of the background knowledge graph that are connected with the second node of the background knowledge graph; and
- append the selected further nodes to the scene graph.

* * * * *